United States Patent [19]
Hills

[11] Patent Number: 5,916,491
[45] Date of Patent: *Jun. 29, 1999

[54] GAS-LIQUID VORTEX MIXER AND METHOD

[75] Inventor: Blair Howard Hills, Charleston, W. Va.

[73] Assignee: Rhone-Poulenc, Inc., Research Triangle Park, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/784,231

[22] Filed: Jan. 16, 1997

[51] Int. Cl.$^6$ .................................................... B01F 3/04
[52] U.S. Cl. ............................................ 261/91; 261/120
[58] Field of Search ................................ 261/93, 91, 120; 210/219, 220, 221.2, 758

[56] References Cited

U.S. PATENT DOCUMENTS

| | | | |
|---|---|---|---|
| Re. 32,562 | 12/1987 | Litz | 261/91 |
| 2,130,402 | 9/1938 | Textor | 261/93 |
| 2,293,183 | 8/1942 | Walker | 261/93 |
| 2,801,083 | 7/1957 | Balassa | 261/93 |
| 2,928,661 | 3/1960 | MacLaren | 261/24 |
| 3,744,765 | 7/1973 | Bard | 259/96 |
| 3,806,452 | 4/1974 | Walker | 261/93 |
| 3,846,516 | 11/1974 | Carlson | 261/87 |
| 3,933,640 | 1/1976 | Kirk et al. | 210/197 |
| 3,969,446 | 7/1976 | Franklin, Jr. | 261/87 |
| 4,259,267 | 3/1981 | Wang | 261/93 |
| 4,328,175 | 5/1982 | Roeckel et al. | 261/91 |
| 4,347,004 | 8/1982 | Platts | 366/137 |
| 4,437,765 | 3/1984 | Seeger | 366/264 |
| 4,454,077 | 6/1984 | Litz | 261/91 |
| 4,645,603 | 2/1987 | Frankl | 210/629 |
| 4,695,378 | 9/1987 | Ackman et al. | 210/198.1 |
| 4,919,849 | 4/1990 | Litz et al. | 261/93 |
| 4,956,080 | 9/1990 | Josefik | 210/109 |
| 5,009,816 | 4/1991 | Weise et al. | 261/21 |
| 5,061,406 | 10/1991 | Cheng | 261/76 |
| 5,073,309 | 12/1991 | Bousquet et al. | 261/29 |
| 5,085,809 | 2/1992 | Stirling | 261/77 |
| 5,200,080 | 4/1993 | Bergman, Jr. et al. | 210/607 |
| 5,314,076 | 5/1994 | La Place et al. | 210/205 |
| 5,451,348 | 9/1995 | Kingsley | 261/93 |
| 5,494,576 | 2/1996 | Hoppe et al. | 210/198.1 |

OTHER PUBLICATIONS

Bergman Jr. et al., "Odor and VOC Emission Minimization By In-Situ Oxygenation", Praxair Technology, Inc. brochure (1994).

*Primary Examiner*—Richard L. Chiesa
*Attorney, Agent, or Firm*—Alan G. Towner; Eckert Seamans Cherin & Mellott, LLC

[57] ABSTRACT

An apparatus and method are provided for mixing gas and liquid. An impeller is rotatably mounted inside a draft tube. Inlet baffles are mounted adjacent the inlet end of the draft tube in close proximity to the impeller. In addition, outlet baffles are mounted adjacent the outlet end of the draft tube in close proximity to the impeller. Rotation of the impeller draws liquid down through the draft tube and creates vortices which serve to entrain gas into the liquid. The provision of inlet and outlet baffles directly adjacent the rotating impeller produces high gas entrainment and shear rates and improves gas transfer efficiency. The gas-liquid vortex mixer is particularly suitable for treating industrial and municipal waste water, as well as various other liquids. Gases such as air, oxygen, hydrogen, and the like are efficiently dissolved in such liquids during operation of the gas-liquid vortex mixer.

33 Claims, 3 Drawing Sheets

GAS-LIQUID VORTEX MIXER AND METHOD

FIELD OF THE INVENTION

The present invention relates to gas-liquid mixers, and more particularly relates to gas-liquid vortex mixers which produce high gas entrainment and shear rates and improved mixing capabilities.

BACKGROUND INFORMATION

Gas-liquid mixing systems are conventionally used for various purposes. For example, oxygen is often used to treat liquids such as sewage and hydrometallurgical process liquids, while hydrogen is used to treat various types of unsaturated organic liquids.

Waste water treatment is one particular application where gas-liquid mixing systems are used. Industrial and municipal waste water is often treated by biotreatment techniques in which aerobic organisms convert contaminants into environmentally safe substances. Sufficient oxygen must be provided to the aerobic organisms in order to carry out the biotreatment process. Accordingly, oxygen delivery systems are conventionally used to dissolve either pure oxygen or oxygen from air in the water being treated. In order to be economically feasible, most of the injected pure oxygen must dissolve in the waste water because either the cost of oxygen or the cost of power to aerate with air typically represents the highest operating cost of the system.

One type of conventional gas-liquid mixing system is typically referred to as the Advanced Gas Reactor (AGR) system. Such AGR systems incorporate an open ended hollow draft tube in a mixing vessel. An impeller is positioned within the hollow draft tube in order to draw liquid into the top of the hollow draft tube for discharge at the bottom thereof to produce a recirculating flow path in the mixing vessel. Vortices are formed in the inlet area of the draft tube in order to draw feed gas from the overhead space above the liquid into the recirculating liquid passing downward through the draft tube.

U.S. Pat. No. 4,328,175 to Roeckel et al. discloses a vortex mixer including a draft tube with a conical inlet section. The inner surface of the inlet cone includes two to four small baffles which are said to prevent bulk rotation of liquid in the vessel during rotation of the mixer impeller.

U.S. Pat. Nos. 4,454,077 and Re. 32,562 to Litz disclose a vortex mixer including an axial impeller and several additional structural features which are said to improve gas utilization efficiency. In particular, efficiency is said to be increased by providing protuberances or indentations on the axial impeller shaft, providing vertical baffles in the draft tube below the axial impeller, and providing a radial flow impeller on the impeller shaft between the blades of the axial impeller and the vertical baffles. The draft tube includes a conical inlet section which forms an angle of from about 145 to about 175° with the outside vertical wall of the draft tube. Vertical inlet guide baffles are mounted in the conical inlet.

U.S. Pat. No. 5,009,816 to Weise et al. discloses a vortex mixer comprising multiple stacked mixers similar to those disclosed in U.S. Pat. Nos. 4,454,077 and Re. 32,562. The mixer likewise includes turbulence-promoting protuberances on the axial impeller shaft and a radial flow impeller mounted below the blades of the axial impeller.

The disclosure of each patent cited above is incorporated herein by reference.

Although attempts have been made to increase the efficiency of vortex mixers, the above-noted mixers require large amounts of pumped liquid and multiple recirculation passes of liquid and gas through the mixer in order to achieve sufficient gas dissolution. This leads to a large amount of energy input to achieve the desired amount of gas dissolution. The present invention has been developed in view of the foregoing, and to remedy other deficiencies of the prior art.

SUMMARY OF THE INVENTION

An apparatus and method are provided for mixing gas and liquid. An impeller is rotatably mounted inside a draft tube. Inlet baffles are mounted adjacent the inlet end of the draft tube in close proximity to the impeller. In addition, outlet baffles are mounted adjacent the outlet end of the draft tube in close proximity to the impeller. Rotation of the impeller draws liquid down through the draft tube and creates vortices which serve to entrain gas into the liquid. The provision of inlet and outlet baffles directly adjacent the rotating impeller produces high gas entrainment and shear rates and improves gas transfer efficiency. The gas-liquid vortex mixer is particularly suitable for treating industrial and municipal waste water, as well as various other liquids. Gases such as air, oxygen, hydrogen, and the like are efficiently dissolved in such liquids during operation of the gas-liquid vortex mixer. The apparatus also acts to provide bulk mixing of liquid in the containment vessel.

An object of the present invention is to provide a gas-liquid vortex mixer having improved gas transfer efficiency.

Another object of the present invention is to provide an apparatus for mixing gas and liquid including a draft tube having an inlet end and an outlet end, at least one impeller rotatably mounted at least partially inside the draft tube having at least one leading edge and at least one trailing edge, at least one inlet baffle adjacent the inlet end of the draft tube in close proximity to the at least one leading edge of the impeller, and at least one outlet baffle adjacent the outlet end of the draft tube in close proximity to the at least one trailing edge of the impeller.

Another object of the present invention is to provide an apparatus for mixing gas and liquid including a draft tube having an inlet end and an outlet end, impeller means at least partially inside the draft tube for drawing liquid through the draft tube and creating at least one gas-filled vortex in the liquid, inlet baffle means adjacent the inlet end of the draft tube for reducing prerotation of the fluid entering the impeller and draft tube, and shear inducing means adjacent the outlet end of the draft tube in close proximity to the impeller means for creating high shear rates in the gas-liquid stream as it passes from the impeller through the outlet end of the draft tube.

Another object of the present invention is to provide a method of mixing gas and liquid including the steps of providing a draft tube having an inlet end and an outlet end, mounting an impeller at least partially within the draft tube, positioning at least one inlet baffle adjacent the inlet end of the draft tube in close proximity to the impeller, positioning at least one outlet baffle adjacent the outlet end of the draft tube in close proximity to the impeller, positioning the draft tube in a body of liquid to be treated, and rotating the impeller to thereby draw the liquid through the draft tube and create at least one vortex in the liquid.

These and other objects of the present invention will be more readily understood from the following description.

DESCRIPTION OF THE PREFERRED EMBODIMENTS

Figure 1:
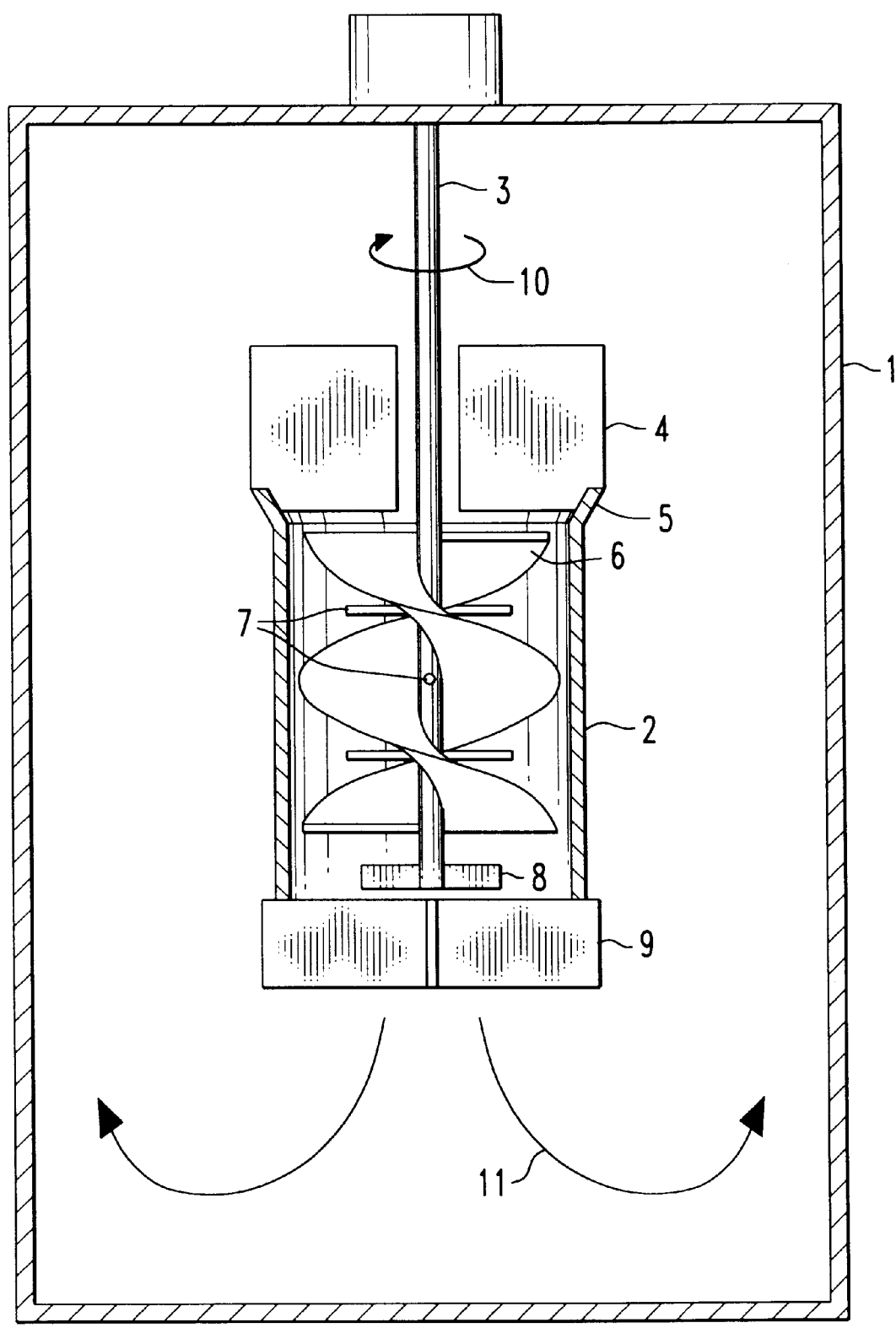
FIG. 1 is a partially schematic sectional side view of a conventional gas-liquid vortex mixer.

A conventional vortex mixer is shown in FIG. 1. A vessel 1 for containing a liquid such as water surrounds a draft tube 2. A rotatable shaft 3 extends from the top of the vessel 1 into the draft tube 2. The top of the draft tube 2 includes a conical inlet section 5 having vanes 4 attached thereto. A helical impeller 6 is mounted on the shaft 3 inside the draft tube 2. Bars 7 are mounted on the shaft 3, while a radial impeller 8 is mounted at the bottom of the shaft 3. Baffles 9 are mounted at the bottom of the draft tube 2 below the radial impeller 8. Rotation of the shaft 3 in the direction of arrow 10 causes the impeller 6 to rotate and draw liquid down through the draft tube 2 in a circulation pattern shown by arrows 11.

The conventional vortex mixer shown in FIG. 1, which corresponds to the mixer disclosed in U.S. Pat. Nos. 4,454,077 and Re. 32,562, relies on the mixing bars 7 and radial impeller 8 to create turbulence and increase gas utilization efficiency during operation of the mixer. In the mixing process, a vortex is formed downward from the surface of the liquid in the vicinity of the conical inlet 5 such that gas is drawn down into the draft tube 2. According to the disclosures of U.S. Pat. Nos. 4,454,077 and Re. 32,562, the apparatus shown in FIG. 1 is capable of appreciably increasing the flow of gas and reducing the size of bubbles generated in comparison with similar prior art mixers. The resultant reduction in bubble size is said to increase the area of contact between the gas and liquid, thereby increasing the efficiency of the mixer.

In accordance with the present invention, an improved gas-liquid vortex mixer is provided which exhibits substantially improved gas transfer efficiency. As used herein, the term "gas transfer efficiency" means the power required to dissolve a given mass of gas in a mass of liquid. Gas transfer efficiency may be described in units of kg/(kw·hr) or lb/(horsepower·hr). The vortex mixer may be used to mix gases such as oxygen, air, hydrogen, sulfur dioxide, chlorine, bromine, inorganic and organic reactants and gaseous acids or bases into liquids such as water, basic solutions, acidic solutions, organic liquids, inorganic solutions and liquid-solid suspensions. The vortex mixer is particularly suitable for mixing oxygen-containing gases into industrial and municipal waste water.

Figure 2:
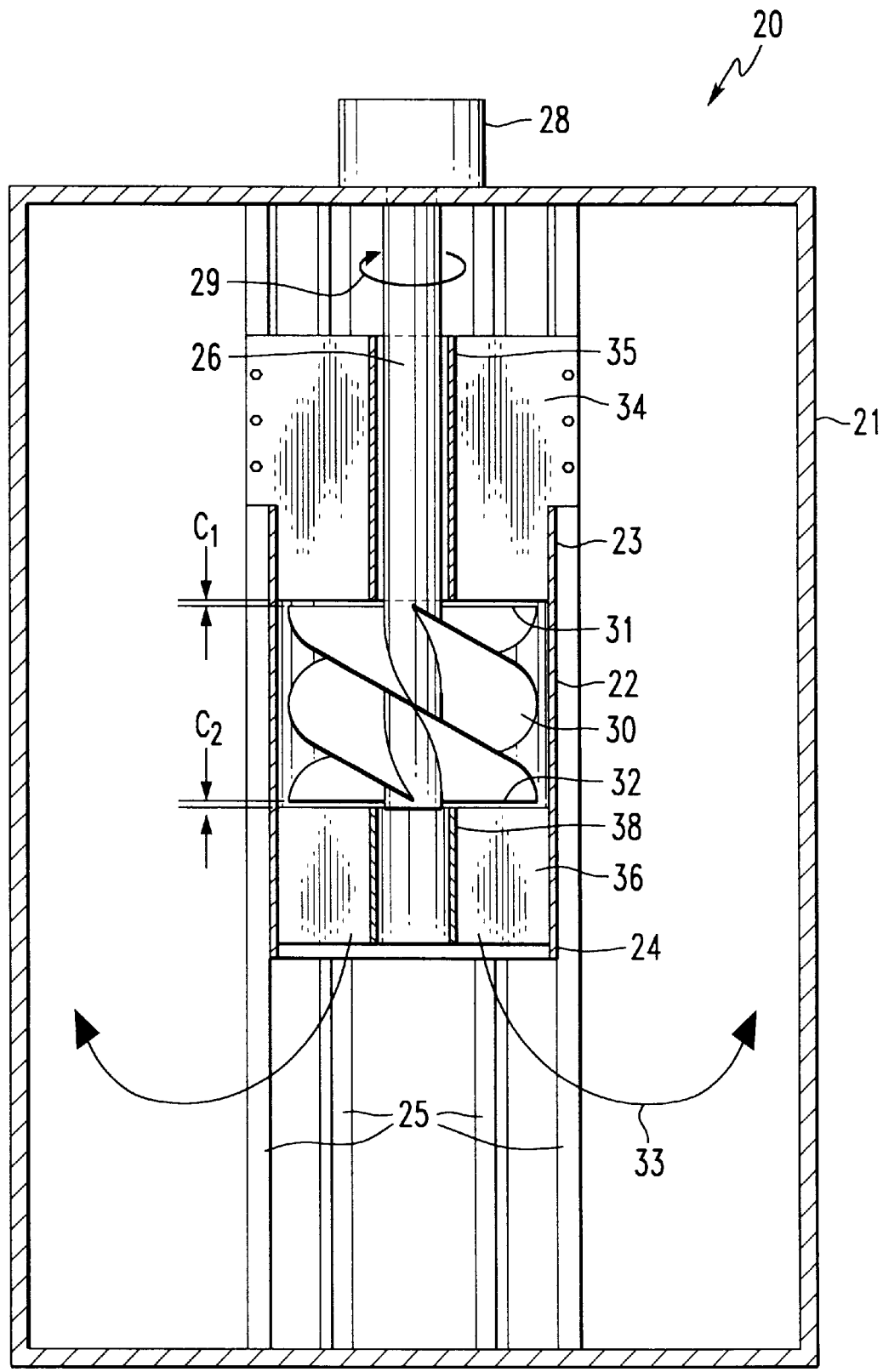
FIG. 2 is a partially schematic sectional side view of a gas-liquid vortex mixer in accordance with an embodiment of the present invention.

An embodiment of a gas-liquid vortex mixer of the present invention is shown in FIG. 2. The vortex mixer 20 may be provided in a vessel 21. The vessel 21 may be an open or closed vessel such as a tank or other suitable container. In addition to the vessel 21 shown in FIG. 2, the vortex mixer 20 may be used in any other body of liquid such as a lagoon, reservoir, lake or the like.

A generally cylindrical draft tube 22 is supported within the vessel 21 by several support members 25. In the embodiment shown in FIG. 2, the support members 25 are attached to the top and bottom of the vessel 21. However, any other suitable support structure may be used. For example, the draft tube 22 may be supported only by legs extending to the bottom of the vessel 21 or arms extending to the side and/or top of the vessel. The draft tube 22 may also be supported by any suitable floatation device on or under the surface of the liquid to be treated.

The draft tube 22 includes an upper inlet end 23 and a lower outlet end 24. While the inlet end 23 of the draft tube is cylindrical in FIG. 2, any other suitable geometry may be used. For example, the inlet end 23 may be cone or pyramid shaped to provide an inlet area larger than the inner cross sectional area of the remainder of the draft tube 22, similar to that shown in FIG. 1. Alternatively, the inlet end 23 may comprise a cylindrical section having a diameter greater than the diameter of the draft tube 22. In this case, the cylindrical inlet section may be connected to the remainder of the draft tube by a flange extending radially from the draft tube 22 at any suitable angle and/or may be connected to the support members 25. The inlet section may be adjustable in height in relation to the remainder of the draft tube, such as by an adjustable weir, in order to vary the amount of fluid flowing into the draft tube, which allows variation in the ratio of gas to liquid mixed.

As shown in FIG. 2, an impeller shaft 26 extends into the draft tube 22. The shaft 26 is actuated by a motor 28 such as a driver driven through a gear box for rotation in the direction of arrow 29. An impeller 30 is mounted on the shaft 26 inside the draft tube 22. The impeller 30 includes at least one leading edge 31 and at least one trailing edge 32. During operation of the vortex mixer 20, rotation of the shaft 26 and impeller 30 in the direction of the arrow 29 causes liquid to circulate generally in the direction shown by the arrows 33. Various types of impellers 30 may be used in accordance with the present invention. For example, helical or marine impellers may be used. In the embodiment shown in FIG. 2, the impeller 30 includes four helical blades, each of which extends about 180° around the shaft 26. However, more or less blades may be used and different blade geometries may be employed.

The clearance between the blades of the impeller 30 and the inner diameter of the draft tube 22 is preferably minimized. The impeller blades 30 typically extend radially from the central axis of the shaft 26 to a diameter of at least about 90% of the inner diameter of the draft tube 22, more preferably at least about 95%, and most preferably about 97%. For example, for a draft tube 22 having an inner diameter of about 36 inches, the impeller blades 30 preferably have a diameter of at least about 35 inches. For draft tubes having inner diameters of between about 0.3 and 5 feet, the clearance between the radial outermost tips of the impeller blades 30 and the inner surface of the draft tube 22 is preferably less than about 1.5 inches, more preferably less than about 1 inch.

Figure 3:
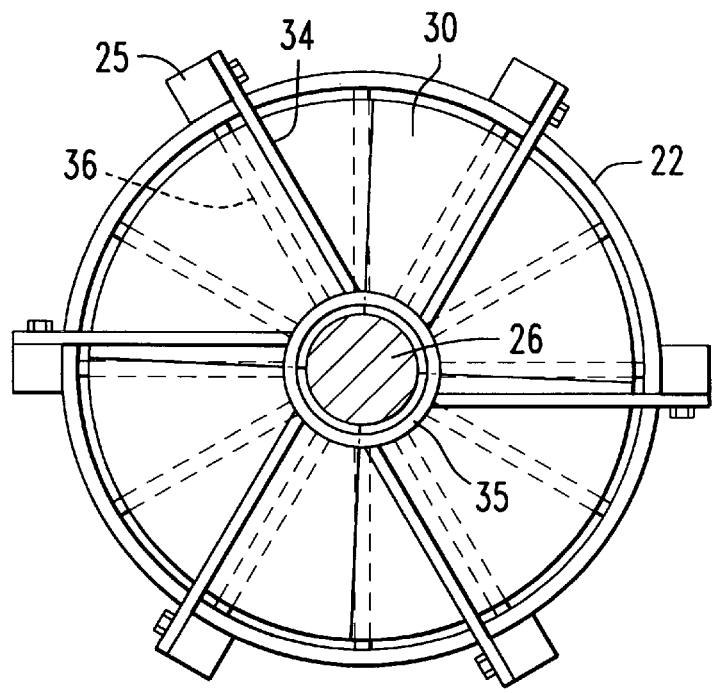
FIG. 3 is a top sectional view of a gas-liquid vortex mixer in accordance with an embodiment of the present invention.

As shown most clearly in FIGS. 2 and 3, the vortex mixer 20 includes several inlet baffles 34 in the vicinity of the inlet end 23 of the draft tube 22. The inlet baffles 34 may be mounted by any suitable means such as mechanical fasteners or welding. In the embodiment shown in FIGS. 2 and 3, the inlet baffles 34 are attached to the support members 25 by bolts. However, the inlet baffles 34 may be fastened in relation to the draft tube 22 at any other suitable location using various types of fastening means. The inlet baffles 34 are preferably connected to a sleeve 35 which surrounds the shaft 26 in order to provide increased structural rigidity. The inlet baffles 34 may be attached to the sleeve 35 by welding, mechanical fasteners or any other suitable means. In order to increase the surface area of the inlet baffles 34, it is preferred to minimize the clearance between the sleeve 35 and the shaft 26, and to minimize the thickness of the sleeve 35. It is also preferred to provide several inlet baffles 34 in order to sufficiently reduce prerotation of the liquid in the direction of rotation of the impeller 30 as the liquid enters the impeller at the inlet end 23 of the draft tube 22, thereby preventing the collapse of vortices. While six inlet baffles 34 are shown in FIG. 3, any suitable number may be used as long as they effectively reduce prerotation. From 2 to 10 inlet baffles 34 are preferably used. In addition, while the baffles 34 shown in FIGS. 2 and 3 are flat and extend vertically, they can be curved or angled to provide a counterflow of fluid in a direction opposite to the direction of rotation 29 of the impeller 30.

As shown most clearly in FIG. 2, the clearance $C_1$ between the inlet baffles 34 and the leading edge 31 of the impeller 30 is minimized. By reducing the clearance $C_1$, prerotation of the liquid is reduced and high shear rates are produced during operation of the mixer. The clearance $C_1$ is preferably less than about 15% of the inner diameter of the draft tube 22, more preferably less than about 2%. For example, for draft tubes having inner diameters of from about 0.3 to 5 feet, the clearance $C_1$ is preferably less than 10 inches, more preferably less than 2 inches. As a particular example, the clearance $C_1$ is preferably less than about 1.5 inches for a draft tube having an inner diameter of about 36 inches.

Figure 4:
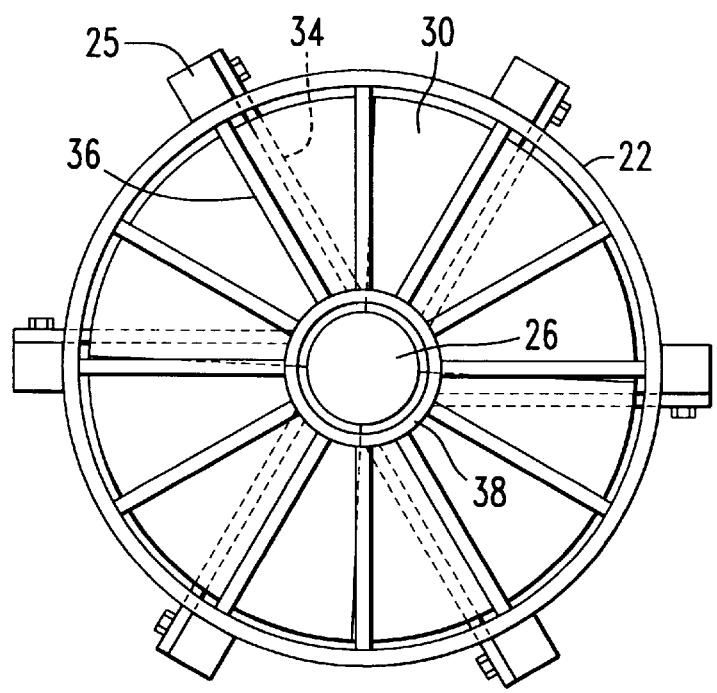
FIG. 4 is a bottom view of a gas-liquid vortex mixer in accordance with an embodiment of the present invention.

As shown most clearly in FIGS. 2 and 4, the vortex mixer 20 includes outlet baffles 36 located adjacent the impeller 30 in the vicinity of the outlet end 24 of the draft tube 22. The outlet baffles 36 may be fastened in relation to the draft tube 22 by any suitable means, such as welding or mechanical fasteners. The outlet baffles 36 may be connected to a sleeve 38 by welding or any other suitable means in order to increase structural rigidity. In the embodiment shown in FIG. 4, twelve outlet baffles 36 are disposed at equal distances around the inner circumference of the draft tube 22. In order to increase shear rates, it is preferable to use several outlet baffles 36, for example, from 4 to about 36 outlet baffles. While flat vertically extending outlet baffles 36 are shown in FIGS. 2 and 4, curved or angled outlet baffles may be used. In addition to, or in place of, the stationary outlet baffles 36 shown in FIGS. 2 and 4, the baffles may be rotated in a direction opposite the rotational direction 29 of the impeller 30. Such counter-rotating outlet baffles may be provided, for example, in the form of a counter-rotating impeller. Alternatively, the outlet baffles may be in the form of at least one perforated plate disposed horizontally below the impeller 30.

In accordance with the present invention, the outlet baffles 36 are positioned directly adjacent the trailing edge 32 of the impeller 30. The clearance $C_2$ between the trailing edge 32 of the impeller 30 and the outlet baffles 36 is preferably less than about 10% of the inside diameter of the draft tube, more preferably less than about 2%. For example, for draft tubes having inner diameters of from about 0.3 to 5 feet, the clearance $C_2$ is preferably less than about 3 inches, more preferably less than about 1 inch. As a particular example, the clearance $C_2$ is preferably less than about 0.75 inch for a draft tube having an inner diameter of three feet. It has been found in accordance with the present invention that by minimizing the clearance $C_2$, substantially increased gas entrainment and shear rates are achieved, resulting in substantially increased gas transfer efficiency. By minimizing the clearance $C_2$ and providing a sufficient number of outlet baffles 36, substantially all of the liquid travelling axially downward through the draft tube 22 contacts at least one of the outlet baffles as it exits the impeller 30. This contact region has been found to maintain high shear rates while increasing the volume of gas entrained in the liquid. This substantially improves gas transfer efficiency in comparison with conventional vortex mixers as shown in FIG. 1 which position a radial impeller at the bottom of the axial impeller.

The various components of the vortex mixer 20 are made from any suitable materials, preferably metals. For example, the draft tube 22, shaft 26, impeller 30, inlet baffles 34 and outlet baffles 36 can be made from metal such as stainless steel.

In accordance with a preferred embodiment of the present invention, the tip speed of the impeller 30 is controlled in order to provide improved mixing. The term "tip speed" means the angular velocity at which the radial outermost portion of the impeller 30 travels. The tip speed of the impeller 30 is controlled in order to provide sufficient shear rates in the region where the impeller 30 passes over the outlet baffle 36. Typical tip speeds are preferably greater than about 30 feet per second, more preferably greater than about 40 feet per second, and most preferably greater than about 50 feet per second. Depending on the diameter of the impeller 30 used, the rotational speed of the shaft 26 is controlled in order to achieve the desired impeller tip speed. For example, for an impeller having a diameter of 3 feet, the shaft 26 may be rotated at a speed of about 350 rpm to obtain an impeller tip speed of about 50 feet/second. The use of relatively high impeller tip speeds in combination with the positioning of the stationary or counter-rotating outlet baffles 36 in close proximity to the trailing edge 32 of the impeller 30 has been found to result in a substantial increase in gas entrainment and gas transfer efficiency in comparison with prior art designs. In accordance with the present invention, gas transfer efficiency may be increased on the order of about 30 or 40% higher than the efficiency achieved with conventional vortex mixers as shown in FIG. 1.

The following examples are intended to illustrate various aspects of the present invention and are not intended to limit the scope thereof.

EXAMPLE 1

A conventional vortex mixer similar to that shown in FIG. 1 is constructed. The draft tube of the mixer has an inner diameter of about 37 inches. A helical impeller having a diameter of about 35 inches is installed inside the draft tube. The impeller includes 4 blades, each of which extend about 180° around the circumference of the impeller shaft. A radial impeller is mounted between the helical impeller and four baffles as shown in FIG. 1. The helical impeller is rotated at a speed of 345 rpm to provide a helical impeller tip speed of about 53 feet/second. The unit is floated in a 300,000 gallon tank 80% filled with water. The float design prevents back mixing of gas after passing through the draft tube. The top of the draft tube is submerged about 20 inches under the surface of the water. A moderate gas transfer efficiency is measured by the ASCE SOTE technique.

EXAMPLE 2

A vortex mixer is constructed as in Example 1, except the radial impeller is removed, the upper baffles are lowered to within about 0.75 inch of the axial impeller and increased in number from 3 to 6, and the lower baffles are raised to within about 0.5 inch of the axial impeller and increased in number from 4 to 12. The mixer is operated under the same conditions as in Example 1. The resultant gas transfer efficiency, measured by the ASCE SOTE technique, is improved 34% in comparison with the unit of Example 1.

While particular embodiments of the present invention have been described herein, it is to be understood that various changes, additions, modifications and adaptations may be made without departing from the scope of the invention, as set forth in the following claims.

What is claimed is:

1. An apparatus for mixing gas and liquid comprising:
   a draft tube having an inlet end and an outlet end;
   at least one impeller rotatably mounted at least partially inside the draft tube having at least one leading edge and at least one trailing edge, the at least one impeller being positioned in a body of the liquid sufficiently close to a surface of the liquid wherein rotation of the at least one impeller draws the liquid through the draft tube and creates at least one gas-filled vortex in the liquid extending from the surface of the liquid;
   at least one inlet baffle adjacent the inlet end of the draft tube in close proximity to the at least one leading edge of the impeller, wherein the at least one inlet baffle and the at least one leading edge of the impeller have a clearance of less than about 2 inches and less than about 5 percent of an inner diameter of the draft tube; and
   at least one outlet baffle adjacent the outlet end of the draft tube in close proximity and directly adjacent to the at least one trailing edge of the impeller, wherein the at least one outlet baffle and the at least one trailing edge of the impeller have a clearance of less than about 1 inch and less than about 2 percent of the inner diameter of the draft tube, and there are no structural components located between the at least one outlet baffle and the at least one trailing edge of the impeller.

2. The apparatus of claim 1, wherein the draft tube is substantially cylindrical and defines a central axis.

3. The apparatus of claim 2, wherein the inlet end of the draft tube has an inner cross sectional area greater than the inner cross sectional area of the remainder of the draft tube.

4. The apparatus of claim 2, wherein the impeller has a diameter at least about 90 percent of the inner diameter of the draft tube.

5. The apparatus of claim 2, wherein the impeller comprises at least one helical blade.

6. The apparatus of claim 5, wherein one of the leading edges and one of the trailing edges are provided on a single one of the helical blades.

7. The apparatus of claim 2, wherein the inner diameter of the draft tube is from about 0.3 to about 5 feet.

8. The apparatus of claim 1, wherein the apparatus comprises from 2 to 10 of the inlet baffles.

9. The apparatus of claim 8, wherein the inlet baffles are connected to a sleeve surrounding a shaft of the impeller.

10. The apparatus of claim 2, wherein the inner diameter of the draft tube is from about 0.3 to about 5 feet.

11. The apparatus of claim 1, wherein the apparatus comprises from 4 to about 36 of the outlet baffles.

12. The apparatus of claim 11, wherein the outlet baffles are connected to a sleeve.

13. The apparatus of claim 12, wherein the sleeve is substantially cylindrical and has an axis substantially aligned with the central axis of the draft tube.

14. The apparatus of claim 2, wherein the apparatus comprises a plurality of the outlet baffles, each outlet baffle has an upper edge, and the upper edges of the outlet baffles define a plane substantially perpendicular to the central axis of the draft tube.

15. The apparatus of claim 14, wherein the at least one trailing edge of the impeller is rotatable in a plane substantially parallel with the plane defined by the upper edges of the outlet baffles.

16. The apparatus of claim 15, wherein the at least one trailing edge of the impeller defines a substantially straight line.

17. The apparatus of claim 16, wherein the plane defined by the upper edges of the outlet baffles and the plane defined by the at least one trailing edge of the impeller are spaced apart a distance of less than about 2 percent of the inner diameter of the draft tube.

18. The apparatus of claim 17, wherein the inner diameter of the draft tube is from about 0.3 to about 5 feet and the distance between the plane defined by the upper edges of the outlet baffles and the plane defined by the at least one trailing edge of the impeller is less than about 1 inch.

19. An apparatus for mixing gas and liquid comprising:
   a draft tube having an inlet end and an outlet end and defining a central axis;
   impeller means at least partially inside the draft tube, the impeller means being positioned in a body of the liquid sufficiently close to a surface of the liquid for drawing the liquid through the draft tube and creating at least one gas-filled vortex in the liquid extending from the surface of the liquid;
   inlet baffle means adjacent the inlet end of the draft tube for reducing pre-rotation of the liquid as it enters the draft tube, wherein the inlet baffle means and the impeller means have a clearance of less than about 2 inches and less than about 5 percent of an inner diameter of the draft tube; and
   shear inducing outlet baffle means adjacent the outlet end of the draft tube in close proximity and directly adjacent to the impeller means for creating high shear rates in the liquid as it passes from the impeller means through the outlet end of the draft tube, wherein the shear inducing outlet baffle means and the impeller means have a clearance of less than about 1 inch and less than about 2 percent of the inner diameter of the draft tube, and there are no structural components located between the shear inducing outlet baffle means and the impeller means.

20. The apparatus of claim 19, wherein the shear inducing means comprises substantially vertically extending outlet baffles.

21. The apparatus of claim 19, wherein the inner diameter of the draft tube is from about 0.3 to about 5 feet.

22. The apparatus of claim 19, wherein the inner diameter of the draft tube is from about 0.3 to about 5 feet.

23. The apparatus of claim 19, further comprising means for rotating the impeller means at an impeller tip speed of greater than about 30 feet per second.

24. The apparatus of claim 19, further comprising means for rotating the impeller means at an impeller tip speed of greater than about 40 feet per second.

25. The apparatus of claim 19, further comprising means for rotating the impeller means at an impeller tip speed of greater than about 50 feet per second.

26. The apparatus of claim 19, further comprising means for supporting the draft tube in the body of liquid.

27. The apparatus of claim 26, wherein the support means comprises means for floating the draft tube in the body of liquid.

28. The apparatus of claim 19, wherein the gas is selected from the group consisting of oxygen, air, hydrogen, sulfur dioxide, chlorine, bromine, inorganic reactants, organic reactants, gaseous acids and gaseous bases.

29. The apparatus of claim 19, wherein the liquid is selected from the group consisting of water, basic solutions, acid solutions, organic liquids, inorganic solutions and liquid-solid suspensions.

30. A method of mixing gas and liquid, the method comprising:

providing a draft tube having an inlet end and an outlet end;

mounting an impeller at least partially within the draft tube;

positioning at least one inlet baffle adjacent the inlet end of the draft tube in close proximity of the impeller, wherein the at least one inlet baffle and the impeller have a clearance of less than about 2 inches and less than about 5 percent of an inner diameter of the draft tube;

positioning at least one outlet baffle adjacent the outlet end of the draft tube in close proximity and directly adjacent to the impeller, wherein the at least one outlet baffle and the impeller have a clearance of less than about 1 inch and less than about 2 percent of the inner diameter of the draft tube, and there are no structural components located between the at least one outlet baffle and the impeller;

positioning the draft tube in a body of liquid to be treated with the impeller being positioned in the body of liquid in close proximity to a surface of the liquid; and rotating the impeller to thereby draw the liquid through the draft tube and create at least one gas-filled vortex in the liquid extending from the surface of the liquid.

31. An apparatus for mixing gas and liquid comprising:

a draft tube having an inlet end, an outlet end and an inner diameter of from about 0.3 to about 5 feet;

at least one impeller rotatably mounted at least partially inside the draft tube having at least one leading edge and at least one trailing edge, the at least one impeller being positioned in a body of the liquid sufficiently close to a surface of the liquid wherein rotation of the at least one impeller draws the liquid through the draft tube and creates at least one gas-filled vortex in the liquid extending from the surface of the liquid;

at least one inlet baffle adjacent the inlet end of the draft tube in close proximity to the at least one leading edge of the impeller, wherein the at least one inlet baffle and the at least one leading edge of the impeller have a clearance of less than about 10 inches; and at least one outlet baffle adjacent the outlet end of the draft tube in close proximity and directly adjacent to the at least one trailing edge of the impeller, wherein the at least one outlet baffle and the at least one trailing edge of the impeller have a clearance of less than about 3 inches, and there are no structural components located between the at least one outlet baffle and the at least one trailing edge of the impeller.

32. An apparatus for mixing gas and liquid comprising:

a draft tube having an inlet end and an outlet end defining a central axis and having an inner diameter of from about 0.3 to about 5 feet;

impeller means at least partially inside the draft tube, the impeller means being positioned in a body of the liquid sufficiently close to a surface of the liquid for drawing the liquid through the draft tube and creating at least one gas-filled vortex in the liquid extending from the surface of the liquid;

inlet baffle means adjacent the inlet end of the draft tube for reducing pre-rotation of the liquid as it enters the draft tube, wherein the inlet baffle means and the impeller means have a clearance of less than about 10 inches; and shear inducing outlet baffle means adjacent the outlet end of the draft tube in close proximity and directly adjacent to the impeller means for creating high shear rates in the liquid as it passes from the impeller means through the outlet end of the draft tube, wherein the shear inducing outlet baffle means and the impeller means have a clearance of less than about 3 inches, and there are no structural components located between the shear inducing outlet baffle means and the impeller means.

33. A method of mixing gas and liquid, the method comprising:

providing a draft tube having an inlet end, an outlet end and an inner diameter of from about 0.3 to about 5 feet;

mounting an impeller at least partially within the draft tube;

positioning at least one inlet baffle adjacent the inlet end of the draft tube in close proximity of the impeller, wherein the at least one inlet baffle and the impeller have a clearance of less than about 10 inches;

positioning at least one outlet baffle adjacent the outlet end of the draft tube in close proximity and directly adjacent to the impeller, wherein the at least one outlet baffle and the impeller have a clearance of less than about 3 inches, and there are no structural components located between the at least one outlet baffle and the impeller;

positioning the draft tube in a body of liquid to be treated with the impeller being positioned in the body of liquid in close proximity to a surface of the liquid; and rotating the impeller to thereby draw the liquid through the draft tube and create at least one gas-filled vortex in the liquid extending from the surface of the liquid.

\* \* \* \* \*